2,999,879
PROCESS FOR THE PRODUCTION OF AROMATIC CARBOXYLIC ACIDS

Franz Broich, Ferdinand List, and Nikolaus Roh, Marl, Westphalia, Germany, assignors to Chemische Werke Huls Aktiengesellschaft, Marl, Germany, a corporation of Germany
No Drawing. Filed May 31, 1955, Ser. No. 512,333
Claims priority, application Germany July 1, 1954
4 Claims. (Cl. 260—524)

In application Serial No. 456,618, filed September 16, 1954, in the name of Ferdinand List, one of the present applicants, and assigned to the same assignee as the present application, there is described a process for the production of aromatic carboxylic acids from the corresponding aromatic compounds having aliphatic side chains, by treatment with aqueous hypochlorites, the reaction being carried out in aqueous emulsion.

It has now been found that this process can be used with excellent results upon mononuclear aromatic compounds having aliphatic side chains containing from 1 to 2 carbon atoms and which are substituted in the aromatic nucleus by halogen and/or nitro groups. The corresponding carboxylic acids are produced quite smoothly and in excellent yield and purity.

The starting materials may be halogen and/or nitro substituted mononuclear aromatic compounds containing an aliphatic side chain such as halogen and/or nitro substituted toluene, xylene, ethylbenzene, diethylbenzene, triethylbenzene, phenylethyl alcohol, phenylacetaldehyde, phenylmethylketone as well as for example the crude products obtained by partially oxidizing these compounds with air, said crude products containing, besides unaltered starting material and substituted terephthalic acid, also substituted alcoholic, aldehydic and other oxygen containing compounds.

The process may be carried out for example by emulsifying the substituted aromatic compound to be oxidized by stirring and with the aid of an emulsifying agent in an alkaline aqueous medium whereupon chlorine is introduced while the emulsion is being vigorously stirred. If the aromatic compound to be oxidized is a solid it may be dissolved in a suitable solvent which is as stable as possible against the action of chlorine and hypochlorite under the conditions to be employed in the oxidation e.g. benzene or cyclohexane and the resulting solution is emulsified and the resulting emulsion treated with hypochlorite. The aromatic compound to be oxidized may also be treated in emulsion form with a separately prepared aqueous hypochlorite solution.

Emulsifying agents which are as stable as possible against the action of hypochlorite and chlorine under the conditions of operation of the process should be used for example sulfonates of longchain paraffine hydrocarbons and alkylated naphthalene. In general 1% by weight of the emulsifying agent based upon the weight of the aromatic compound to be oxidized is sufficient. If necessary emulsifying agent may be added continuously or intermittently during the process.

Depending upon the starting material used the hypochlorite treatment may be carried out with heating or cooling as may be determined in each instance by a preliminary run. It is expedient to provide for intensive mixing of the reactants for example by stirring or shaking during the treatment. The treatment with hypochlorite is complete as soon as the odor of hypochlorite disappears.

It is advantageous to use the hypochlorite in somewhat less than the theoretically required amount and to leave a certain small amount of unreacted starting material in the end product because under such conditions the end product is easier to handle than when an excess of hypochlorite is used.

The invention is illustrated by the following specific examples.

Example 1

An emulsion is prepared of 66 parts by weight of partially oxidized 3,5-dichloro-1-ethyl benzene (produced by oxidation with air in the presence of a cobalt salt in known manner, using 33% of the amount of oxygen theoretically required for the oxidation of the 3,5-dichloro-1-ethyl benzene to 3,5-dichlorobenzoic acid), 1000 parts by weight of sodium hypochlorite solution containing 168 parts of active chlorine, 30 parts of sodium hydroxide and 1 part of a paraffine sulfonate. The paraffine sulfonate was produced by treating a high molecular weight paraffine hydrocarbon obtained by the Fischer-Tropsch synthesis with chlorosulfonic acid and saponifying. The mixture is stirred and heated to 75–85° C. until the odor of hypochlorite disappears, and then acidified whereupon an 85% yield of the 3,5-dichlorobenzoic acid separates. After a single crystallization the acid is pure as is indicated by its melting point.

Example 2

An emulsion is made of 1000 parts by weight of sodium hypochlorite solution containing 155 parts of active chlorine, 30 parts of sodium hydroxide, 50 parts of partially oxidized 4-chloro-1-ethyl benzene and 1 part of an emulsifying agent. The partially oxidized 4-chloro-1-ethyl benzene is made in the known manner by oxidizing the 4-chloro-1-ethyl benzene with air in the presence of a cobalt salt, using 30% of the quantity of air theoretically required to oxidize the 4-chloro-1-ethyl benzene to 4-chlorobenzoic acid. The emulsifying agent is the same as that described in Example 1. The mixture is intensively agitated at a temperature of 75–85° C. until the odor of hypochlorite disappears. The resulting mixture is acidified and a yield of 87% of 4-chlorobenzoic acid is recovered therefrom in the usual way.

Example 3

An emulsion is prepared of 1000 parts by weight of sodium hypochlorite containing 155 parts of active chlorine, 50 parts of sodium hydroxide, 100 parts of partially oxidized p-nitrotoluene and 1 part of an emulsifying agent as in Example 1. The partially oxidized p-nitrotoluene was prepared by oxidation with air in the presence of a cobalt salt in known manner, using 30% of the quantity of oxygen theoretically required for the conversion of p-nitrotoluene into p-nitrobenzoic acid. The emulsion is stirred at 75–85° C. until the odor of hypochlorite gas disappeared. By acidifying the p-nitrobenzoic acid is separated in good yield. In a similar manner cresols which have been oxidized with air may be treated in emulsion form with hypochlorites to produce the corresponding oxybenzoic acids.

We claim:
1. Process for the production of a substituted mononuclear aromatic carboxylic acid from the corresponding substituted mononuclear aromatic compound having an aliphatic side chain with 1 to 2 carbon atoms, said compound being substituted in the aromatic nucleus by a member of the group consisting of halogen and nitro groups which comprises first partially oxidizing said compound with air and then treating the partially oxidized compound in an aqueous emulsion which contains an emulsifying agent at a temperature within the range from 75° to 85° C. with a water soluble hypochlorite in quantity corresponding at the most to the quantity theoretically required until the odor of the hypochlorite has dis- appeared and thereafter acidifying the emulsion to recover the aromatic carboxylic acid formed.

2. Process as defined in claim 1 in which the quantity of hypochlorite used is less than that theoretically required to convert the whole quantity of aromatic compound treated into the desired oxidation product.

3. Process as defined in claim 1 in which the oxidation is effected by introducing chlorine into an alkaline aqueous emulsion of the said aromatic compound.

4. Process as defined in claim 1 in which a solution of the said aromatic compound in an organic solvent which is inert to hypochlorite is emulsified in an aqueous solution of hypochlorite.

References Cited in the file of this patent

UNITED STATES PATENTS

| | | |
|---|---|---|
| 939,584 | Barstow | Nov. 9, 1909 |
| 1,930,449 | Bruson et al. | Oct. 10, 1933 |
| 2,120,672 | Mares | June 14, 1938 |
| 2,199,585 | Bone et al. | May 7, 1940 |

OTHER REFERENCES

Wagner et al.: Synthetic Organic Chemistry, pages 419 and 422. (1953).